United States Patent [19]
Hoshino

[11] Patent Number: 5,419,650
[45] Date of Patent: May 30, 1995

[54] STABILIZED PIPE FASTENER USING AN EXPANDABLE SLEEVE

[75] Inventor: Yoshiki Hoshino, Aichi, Japan

[73] Assignee: Hoshino Gakki Co., Ltd., Japan

[21] Appl. No.: 89,680

[22] Filed: Jul. 9, 1993

[30] Foreign Application Priority Data

Sep. 2, 1992 [JP] Japan .................... 4-067563 U

[51] Int. Cl.6 ............................................. F16B 9/02
[52] U.S. Cl. ................................. 403/370; 403/371; 403/256
[58] Field of Search ............... 403/256, 367, 368, 369, 403/370, 371, 22, 13

[56] References Cited

U.S. PATENT DOCUMENTS

| | | | |
|---|---|---|---|
| 2,542,967 | 2/1951 | Waechter | 403/368 |
| 2,972,495 | 2/1961 | Yalen | 403/258 |
| 2,999,706 | 9/1961 | Wilcox | 403/370 |
| 5,263,802 | 11/1993 | Fichot et al. | 403/370 |

Primary Examiner—Edward K. Look
Assistant Examiner—James A. Larson
Attorney, Agent, or Firm—Ostrolenk, Faber, Gerb & Soffen

[57] ABSTRACT

A pipe fastening device including a split sleeve main tubular body with an upper and a lower internal tapered surface. A lower fixing member at the end of the pipe having a frusto-conically shaped body matching the lower tapered inner surface of the tubular body. An upper movable member also having a frusto-conically shaped body matching the upper inner tapered surface at the top of the tubular body. A bolt from an installation member passes through the fixing member and is fixed in the movable member so that tightening of the bolt draws the movable member toward the fixing member. The tapered surfaces cause the tubular body sleeve to expand for securing the tubular body in the pipe. The fixing member and the movable member have protuberant parts received in the groove of the split sleeve tubular body.

8 Claims, 8 Drawing Sheets

STABILIZED PIPE FASTENER USING AN EXPANDABLE SLEEVE

BACKGROUND OF THE INVENTION

This invention relates to a fastening structure for fastening a pipe to another element.

FIG. 8 hereof shows a fastening structure for a stand that supports something like a sign or a panel board, to cite an example. In FIG. 8, a board, etc. is installed on a pipe 91. There is an installation member 92 for the base board, etc.

A connective bush 95, which is approximately tubular in shape, is inserted into the installation end 93 of the pipe 91. The connective bush 95 has a circumferential groove 96 around its outer peripheral surface. The bush is fastened to the pipe 91 when the pipe 91 is caulked around the direction of the groove 96 from outside the pipe 91.

An installation hole 97 for the pipe 91 is formed through the installation member 92, and the pipe 91 is fastened integrally to the installation member 92 by a tightening screw 94 which is inserted from the reverse side of the installation member 92 and is screwed into the screw hole 98 of the connective bush 95.

The pipe 91 and the connective bush 95 are fastened at several caulking locations 99. Its maintenance and fastening are carried out only at several locations on the pipe. This has produced a problem in that a strong holding force is difficult to obtain. This causes a lack of durability against the weight of the board, etc. that is held on the pipe, so that the pipe becomes unsteady.

Further, in such a structure, the inner diameter of the pipe and the outer diameter of the connective bush are the same. This makes it necessary to prepare connective bushes that correspond to the inner diameters of and in conformity with the thicknesses of different pipes in some structures. When there are variations or errors in the inner diameter of the pipe 91, further, it has been difficult to cope with such errors.

SUMMARY OF THE INVENTION

An object of the invention is to provide a pipe fastening device which is capable of securely fastening a pipe to an installation member with a high holding force. Even when the inner diameters of the pipes to be fastened are different, the pipe fastening device of the invention is capable of securely fastening the pipe to an installation member by using the same device. The invention provides a pipe fastening device having a high holding strength which is capable of firmly fastening the pipe, even for a long period of time, and which is capable of firmly fastening the pipe to an installation member through the same fastening device even where the inner diameters of the pipe to be installed may be different.

The invention relates to a pipe fastening device for fastening to the installation end part of a pipe by a tightening bolt that is inserted into the fastening device from the installation hole of the installation member. There is a main tubular body or sleeve which is inserted into the pipe interior near the installation end of the pipe. The sleeve is split at a groove formed along the length direction of the main tubular body sleeve. The groove both serves an orienting function, described below, and enables the sleeve to be spread for clamping. On the inner surface side of the main tubular body sleeve, there is a split collar toward the middle of the length of the sleeve. Below the collar, there is a lower side tapered surface that tapers thinner, i.e. it has a progressively larger internal diameter, toward the bottom end of the sleeve. Above the collar, there is an upper side tapered surface which also tapers thinner, i.e. it has a progressively larger internal diameter, toward the upper end of the sleeve. A flange below the pipe supports the terminal face of the installation end of the pipe. An outer peripheral tapered surface slides on the upper tapered surface of the split collar as it is formed integrally with the aforesaid flange part.

A fastening member comprises a main body part which is approximately in the shape of a frustum of a cone and which has a through hole for a tightening bolt. The outer peripheral tapered surface of the fastening member is of the pitch angle and diameter of the inner lower tapered surface of the sleeve. These surfaces slide over each other and engage as the fastening member moves into the sleeve from below. A protuberant part at the tapered surface engages the cut groove in the split collar in the sleeve of the fastening member which prevents relative rotation.

A movable member comprises a main body part which is also in the shape of a frustum of a cone with an outer peripheral surface that has a pitch angle and diameter of the inner upper tapered surface of the sleeve. These surfaces slide over each other and engage as the moving member moves into the sleeve from above. There is another protuberant part which engages in the cut groove of the split collar in the sleeve to prevent relative rotation. The movable member has a screw hole for receiving the threaded tightening bolt.

A fastening means, e.g. a tightenable bolt, is operated to draw the movable member in the pipe toward the fastening member at the end of the pipe. This presses the cooperatingly tapered surfaces together and expands the split sleeve to clamp to the interior of the pipe.

Other objects and features of the invention are explained with reference to the attached drawings.

DESCRIPTION OF THE PREFERRED EMBODIMENT

Figure 1:
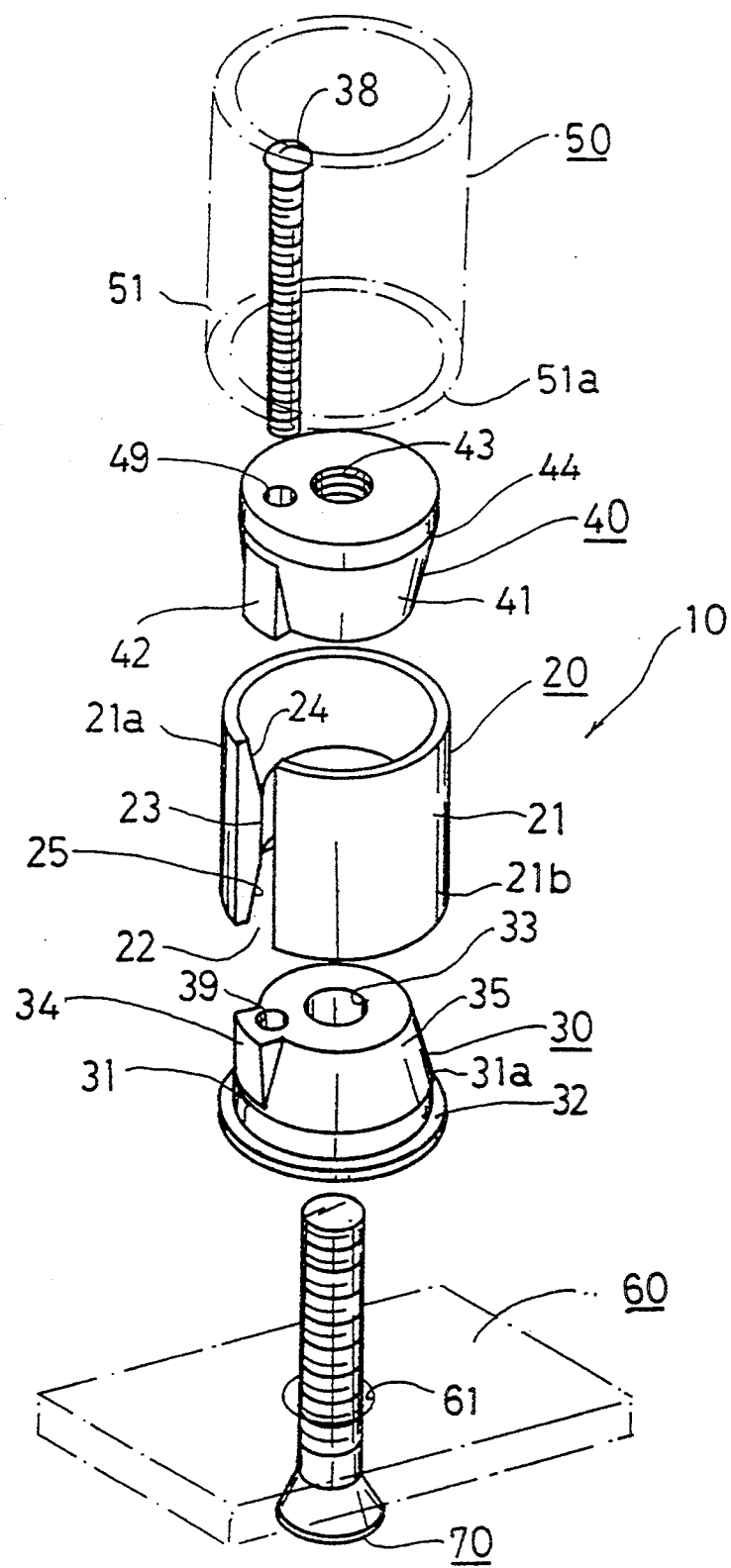
FIG. 1 is an exploded perspective view of a pipe fastening device according to the invention.

As shown in FIGS. 1 through 4, the pipe fastening device 10 according to the invention comprises a longitudinally split sleeve or main tubular body 20, a fastening member 30 at the end of the pipe and a movable member 40 inside the pipe at the top of the sleeve. The device is installed at and inside the installation end 51 of a pipe 50.

The split sleeve 20 comprises a main tubular body 21 which is approximately tubular in shape. It is split in its longitudinal direction by a cut groove 22 formed over the height of the body 21. The body includes a radially thickened collar 23 whose longitudinally central part is formed thicker, i.e. of smaller inner diameter on the inner surface of the main tubular body 21. The interior surface of the body 21 includes an inner upper conically tapered surface 24, which tapers to a gradually larger inner diameter, from the thick collar at the center toward the upper end 21a of the body 21 and a lower conically tapered surface 25 which also tapers to a gradually larger inner diameter from the thick collar at the center toward the bottom end 21b of the body 21.

This split tubular body 20 is inserted into the interior of the pipe in the neighborhood of the installation end 51 of the pipe 50, and that end of the pipe is to then be fastened to the installation member 60.

The fastening member 30 placed toward the bottom of the main body 21 comprises a body 31 which is approximately in the shape of a frustum of a cone. The body 31 includes an outer peripheral, tapered surface 35 that slidingly contacts the inner lower tapered internal surface 25 of the split tubular body 20. The outer tapered surface 35 has a pitch angle and diameter generally corresponding to those features on the inner tapered surface 25.

The body 31 includes a flange 32 which projects outward from the large diameter bottom 31a end of the body 31. The flange 32 underlays and contacts and may be fastened to the installation end 51 of the pipe 50.

Figure 2:
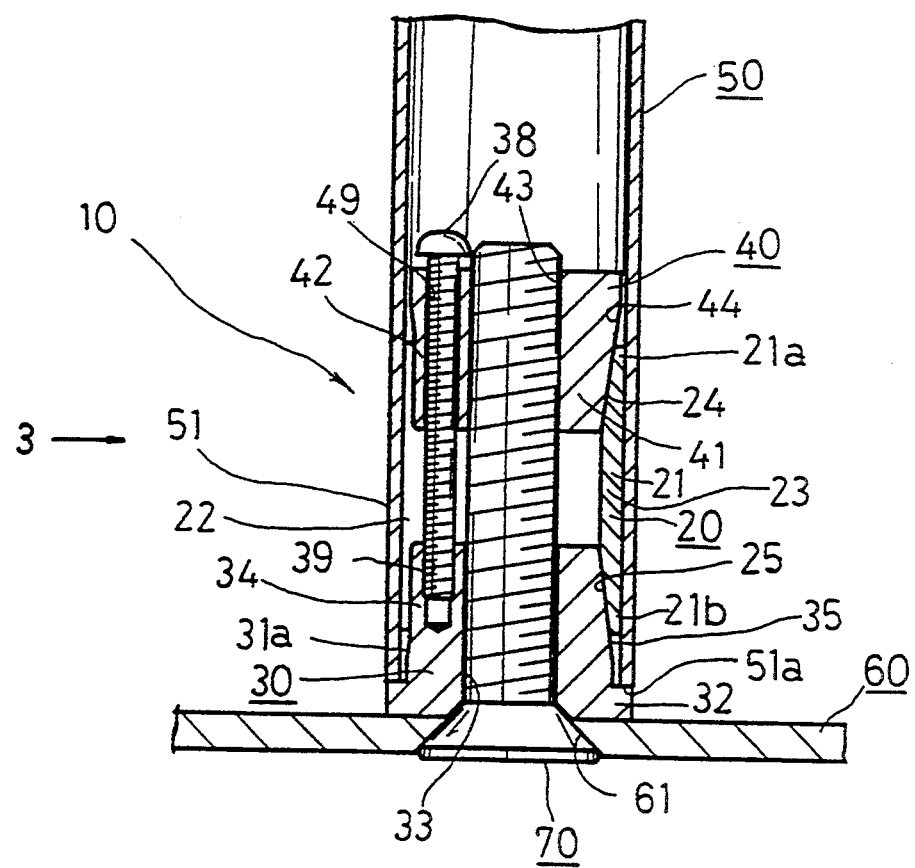
FIG. 2 is a cross section through the device showing a pipe fastened by the device.
Figure 3:
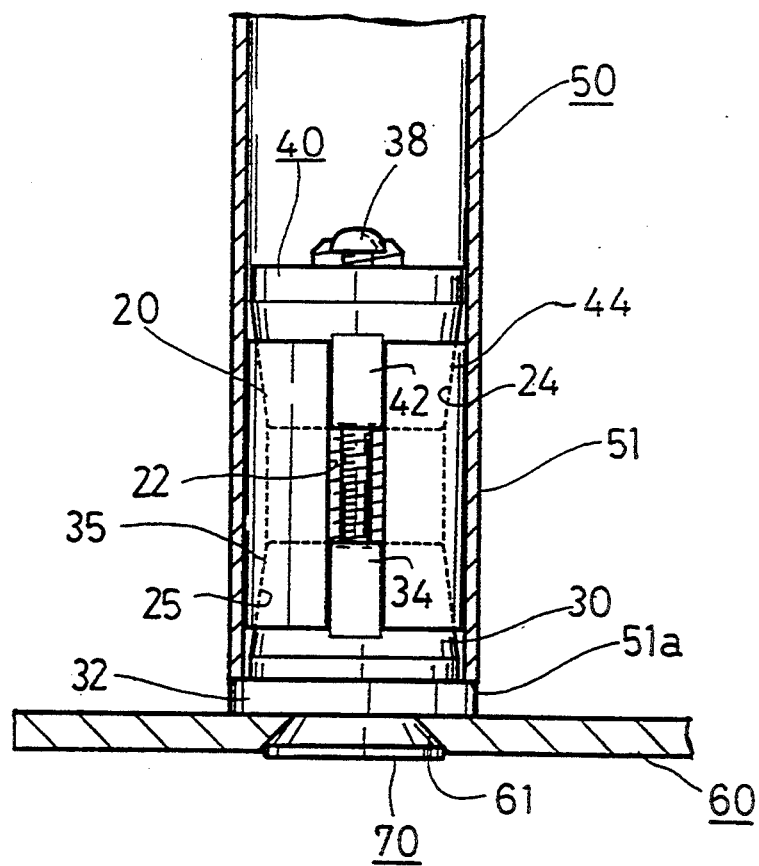
FIG. 3 is a side view of the device.

As can be better understood from FIG. 2, the body 31 has a longitudinal through hole 33 for through passage of a tightening bolt 70. The hole 33 is formed approximately in the center of the cone frustum. The body 31 includes a protuberant part 34, which is formed at one location around the outer peripheral tapered surface 35, for engaging in the groove 22 in the sleeve 20. This determines the location of the fastening member 30 and facilitates the installation of the stopper 38, described below, and prevents relative rotation of the bodies 21 and 30.

The movable member 40 toward the top of the main body 21 is installable inside the pipe 50. The member 40 comprises a body 41 which is also approximately in the shape of a frustum of a cone. The outer peripheral surface of the main body 41 has a lower outer peripheral tapered surface 44 which slidingly contacts the inner, upper side tapered surface 24 of the split sleeve 20. The body 41 has a pitch angle and diameter generally corresponding to those features on the inner tapered surface 24.

The cone shaped members 30 and 40 are oriented to taper narrower toward one another. The movable member 40 includes a screw threaded hole 43 through it that receives the tightening bolt 70 that has extended up from the fastening member 30. The hole 43 is formed approximately in the center of the body 41. The end of the body 41 is inserted into the top of the split body 21.

The body 41 also has a protuberant part 42 formed on its peripheral tapered surface 44. The protuberant part 42 engages the cut groove 22 of the split collar 20, like the protuberant part 34 of the fastening member 30, and orients the body 41. During the screwing of the tightening bolt 70 into the movable member 40 and while the bolt passes through the fastening member 30, the protuberant part 42 also prevents the movable member 40 from rotating along with the rotation of the tightening bolt 70.

A stopper 38 is provided in the fastening member 30. The stopper 38 comprises a known screw or the like and is screwed into a screw hole 39 of the fastening member 30 through a through hole 49 that has been placed in the movable member 40 alongside a screw hole 43 for the tightening bolt of the movable member 40.

Figure 4:
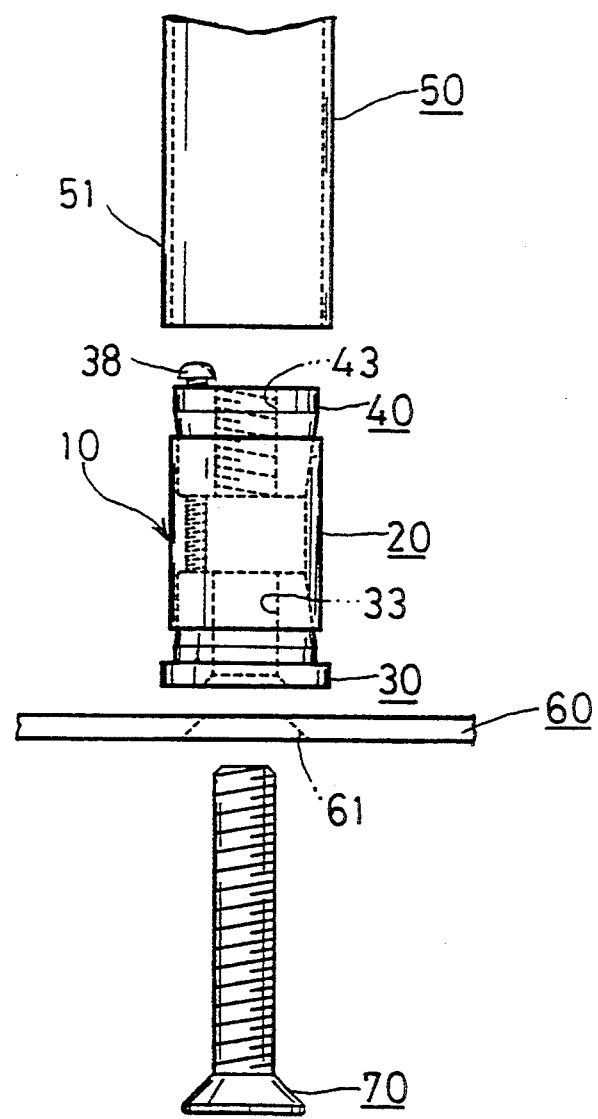
FIG. 4 is an exploded view thereof with the parts separated.

With the above construction, even when the tightening bolt 70 has been removed, the split sleeve 20 and the movable member 40 are prevented from dropping from the fastening member 30 into the pipe 50 as can be understood from FIG. 4.

As is shown in FIG. 2, the device 10 is installed at the installation part 51 of the pipe 50 when the fastening member 30 is on the installation part 51 and the movable member 40 is inserted into the interior of the pipe 50. The pipe 50 with the device 10 is integrally fastened to the installation member 60 by screwing in a tightening bolt 70 which has been inserted from below from the installation hole 61 of such an installation member 60 as a base board, etc. into the screw hole 43 of the movable member 40 through the fixing member 30 of the device 10.

Figure 5:
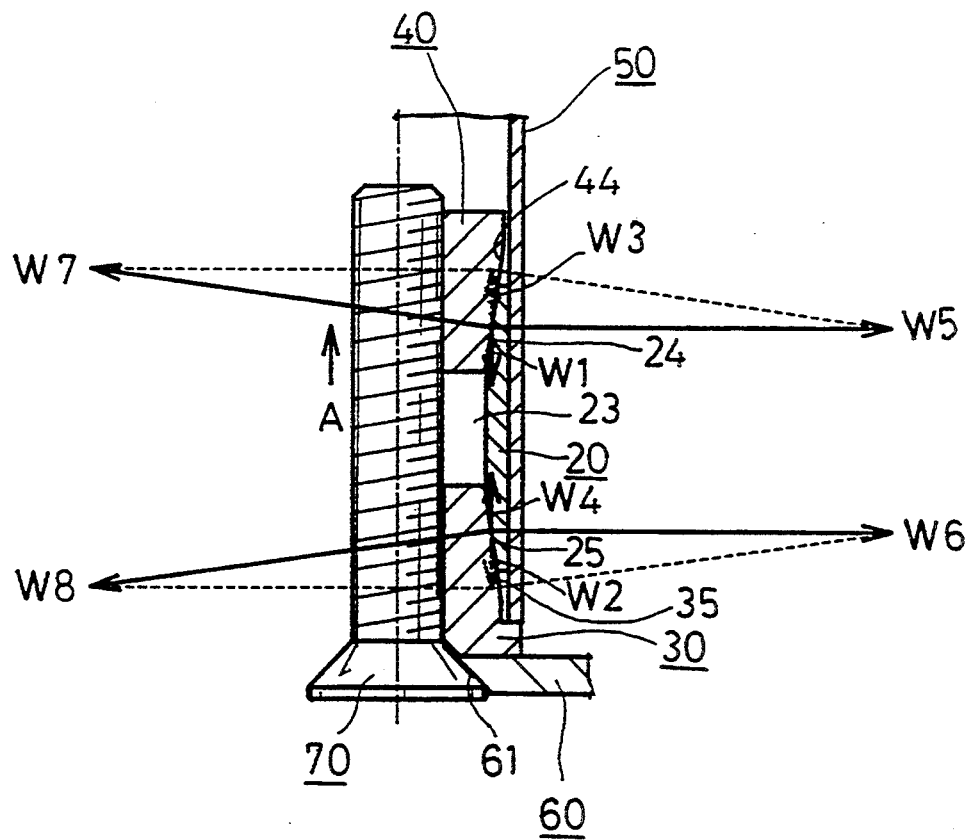
FIG. 5 is a cross section thereof showing the state in which the forces acting on the device.

The device is further explained with reference to FIG. 5. As the tightening bolt 70 is inserted into the movable member 40 of the fastening device 10 and screwed in the direction A, the main body part 41 of the movable member 40 is drawn with the force W1 in the direction of the thick collar 23 of the split sleeve 20. The cut groove 22 formed in the length direction of the split sleeve 20 enables the sleeve 20 to be expanded radially by the force exerted by the outer peripheral tapered surface 44 of the movable member 40. This compresses the front tapered surface 24 of the split sleeve 20.

In addition, the force W1 also acts with the force W2 on the outer peripheral tapered surface 35 of the fastening member 30 that slidingly contacts the lower side tapered surface 25 of the split sleeve 20.

The compressive forces W1 and W2 produce balancing forces W3 and W4 on the tapered surfaces 25, 24 of the sleeve 20 which contact the members 30 and 40 slidingly. At the same time, they produce the compressive forces W5 and W6. The stresses from the split sleeve 20 along the direction of the pipe 50 are indicated by an arrow mark in the Figure and are broken into the forces W7 and W8 that compress the fastening member 30 and the movable member 40 with respect the split sleeve 20, thereby fastening the pipe 50 and the installation member 60 integrally.

In other words, the forces W1 and W2 are widely dispersed in a uniform fashion over the various cooperating tapered surfaces 24, 25, 35, 44 of the split sleeve 20, the fastening member 30 and the movable member 40 which have been inserted into the installation end part 51 of the pipe. This provides a high holding power for the pipe 50.

Figure 6:
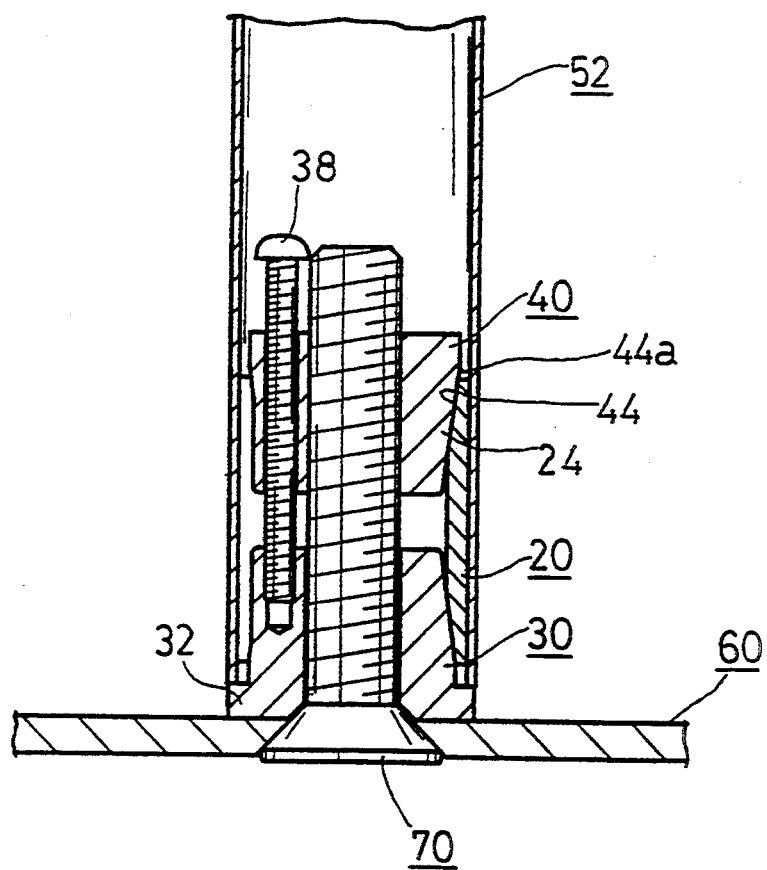
FIG. 6 is a cross section thereof showing another state of the device according to the invention.

As seen from FIG. 6, it is possible to cause the movable member 40 to be inserted deeply into the split sleeve 20 by increasing the tightening force applied on the tightening bolt 70. This might be used, for example, where a thin pipe 52 is fastened and to further expand the exemplary split sleeve 20 by providing a larger diameter part 44a of the outer peripheral tapered surface 44. This makes it possible to cause the split sleeve 20 to tightly adhere to the inner surface of the pipe, thereby securely fastening the sleeve.

Figure 7:
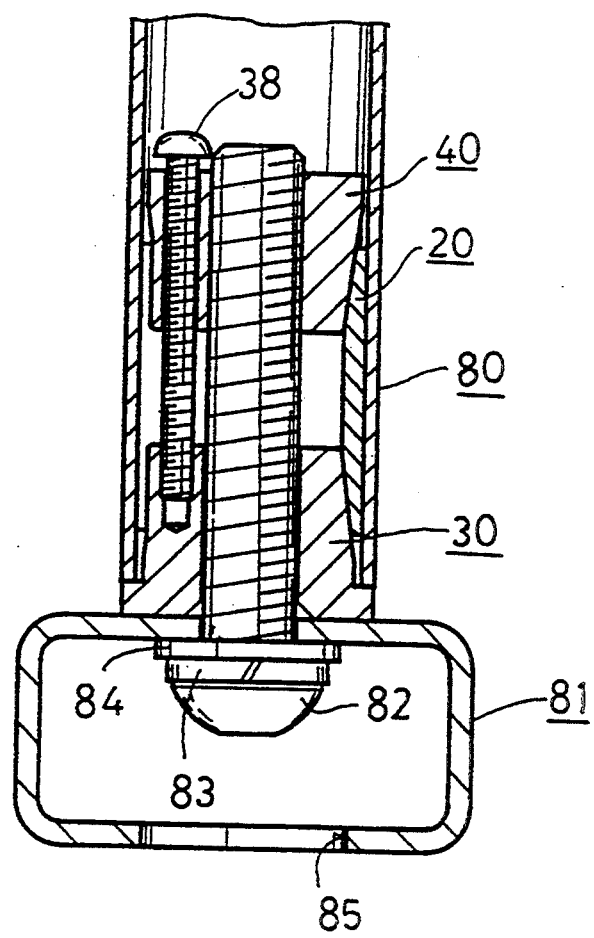
FIG. 7 is a cross section showing still another example of the invention.
Figure 8:
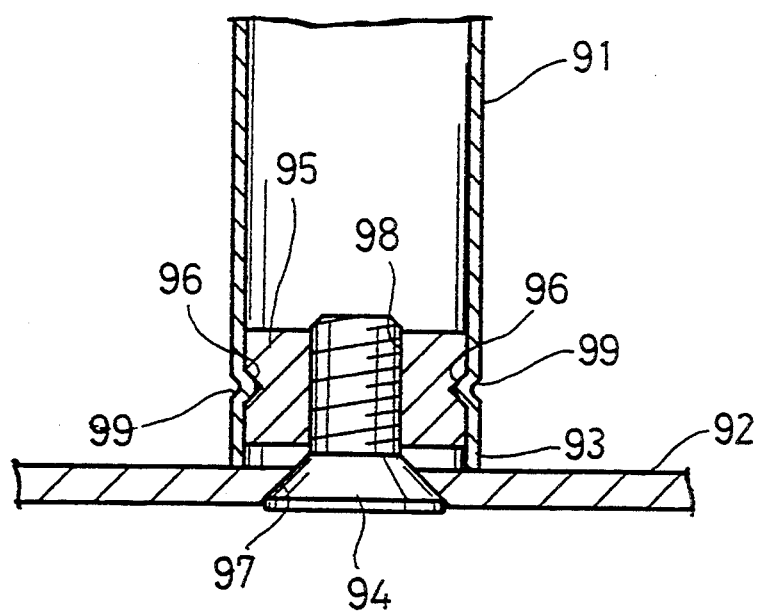
FIG. 8 is cross section of the essential part showing a normal prior art pipe fastening structure.

FIG. 7 shows an example of how two pipes are connected by using a device according to this invention. There is a pipe 80. An angular pipe 81 serves as an installation member. There is a tightening bolt 82 and under its head there is a spring washer 83 above a flat washer 84. A bolt-passage hole is provided in the angular pipe 81.

As has been explained, the tightening force exerted by the tightening bolt is dispersed to the fastening member and to the split sleeve through the movable member. This makes it possible to firmly compress the inner surface of the pipe over a wide area. This provides a strong holding force on the installation member, enabling the pipe to be securely fastened without becoming shaky.

It is possible to increase or decrease the amount of the insertion of the movable member into the split sleeve by modifying the tightening length of the tightening bolt. This adjusts the amount of the radial opening of the split sleeve, which makes it possible to cause the split sleeve to press firmly to the inner wall of the pipe, thereby fastening the pipe to the installation member.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A pipe fastening device for fastening an end of a pipe to an installation member, the fastening device comprising:
    a tubular sleeve split longitudinally and having an exterior size generally corresponding to the interior of the pipe for being installed in the end of the pipe; the sleeve having a main tubular body; the main tubular body having a tubular inner surface including a lower tapered surface which increases in diameter downward along the tubular body and an upper tapered surface above the lower tapered surface which increases in diameter upward along the tubular body;
    a lower pipe fixing member at the lower end of the pipe and engagable with the installation member, and including a first outer peripheral tapered surface which is approximately the shape of a frustum of a cone generally corresponding in pitch angle and diameter to the inner lower tapered surface of the main tubular body and being slidable along the inner lower tapered surface;
    a movable member at the top part of the main body and including a respective second outer peripheral tapered surface which is approximately the shape of a frustum of a cone generally corresponding in pitch angle and diameter to the upper tapered surface of the main tubular body and installed in the main body and being slidable along the upper inner tapered surface; and
    fastening means at the installation member and extending to the fastening device for pulling the movable member toward the installation member at the end of the pipe, for moving the lower fixing member and the upper movable member securely against the inner tapered surfaces of the main tubular body to expand the main tubular body and to securely engage the tubular body with the interior of the pipe.

2. The pipe fastening device of claim 1, wherein the fastening means comprises a bolt with a head which engages the installation member to which the pipe is fastened and the bolt extending through the fixing member into the movable member and engaging the movable member such that tightening the bolt pulls the movable member toward the installation member.

3. A pipe fastening device for fastening an end of a pipe to an installation member, the fastening device comprising:
    a tubular sleeve split longitudinally and having an exterior size generally corresponding to the interior of the pipe for being installed in the end of the pipe; the sleeve having a main tubular body; the main tubular body having a tubular inner surface including a lower tapered surface which increases in diameter downward along the tubular body and an upper tapered surface above the lower tapered surface which increases in diameter upward along the tubular body;
    a lower pipe fixing member at the lower end of the pipe and engagable with the installation member, and including a first outer peripheral tapered surface which is approximately the shape of a frustum of a cone generally corresponding in pitch angle and diameter to the inner lower tapered surface of the main tubular body and being slidable along the inner lower tapered surface;
    a moveable member at the top part of the main body and including a respective second outer peripheral tapered surface which is approximately the shape of a frustum of a cone generally corresponding in pitch angle and diameter to the upper tapered surface of the main tubular body and installed in the main body and being slidable along the upper inner tapered surface;
    fastening means at the installation member and extending to the fastening device for pulling the moveable member toward the installation member at the end of the pipe, for moving the lower fixing member and the upper moveable member securely against the inner tapered surfaces of the main tubular body to expand the main tubular body and to securely engage the tubular body with the interior of the pipe, the longitudinally split main tubular body defining a groove therealong;
    a first protuberant part on the fixing member for engaging in the groove in the main tubular body, for preventing relative rotation of the fixing member and the main tubular body; and
    a second protuberant part on the moveable member for engaging in the groove of the tubular body for preventing relative rotation of the moveable member with respect to the main tubular body.

4. The pipe fastening device of claim 3, wherein the fastening means comprises a bolt which extends from the installation member to which the pipe is fastened and the bolt extending through the fixing member into the movable member and engaging the movable member such that tightening the bolt pulls the movable member toward the installation member.

5. The pipe fastening device of claim 3, further comprising a fastening stopper for holding the fixing member and movable member against total separation such that after removal of the fastening means which draws the movable member toward the installation member, the fixing member and the movable member are still held so that they will not fall apart from the main tubular body, thereby enabling subsequent assembly of the pipe fastening device and the installation member.

6. The pipe fastening device of claim 5, wherein the fastening stopper comprises a bolt extending between the fixing member and the movable member and being tightenable for holding them together.

7. A pipe fastening device for fastening an end of a pipe to an installation member, the fastening device comprising:
   a tubular sleeve split longitudinally and having an exterior size generally corresponding to the interior of the pipe for being installed in the end of the pipe; the sleeve having a main tubular body; the main tubular body having a tubular inner surface including a lower tapered surface which increases in diameter downward along the tubular body and an upper tapered surface above the lower tapered surface which increases in diameter upward along the tubular body;
   a lower pipe fixing member at the lower end of the pipe and engagable with the installation member, and including a first outer peripheral tapered surface which is approximately the shape of a frustum of a cone generally corresponding in pitch angle and diameter to the inner lower tapered surface of the main tubular body and being slidable along the inner lower tapered surface, the fixing member including a flange of a size to rest against the end of the pipe and also to rest on the installation member which fixes the fixing member at the end of the pipe;
   a moveable member at the top part of the main body and including a respective second outer peripheral tapered surface which is approximately the shape of a frustum of a cone generally corresponding in pitch angle and diameter to the upper tapered surface of the main tubular body and installed in the main body and being slidable along the Upper inner tapered surface; and
   fastening means at the installation member and extending to the fastening device for pulling the moveable member toward the installation member at the end of the pipe, for moving the lower fixing member and the upper movable member securely against the inner tapered surfaces of the main tubular body to expand the main tubular body and to securely engage the tubular body with the interior of the pipe.

8. A pipe fastening device for fastening an end of a pipe to an installation member, the fastening device comprising:
   a tubular sleeve split longitudinally and having an exterior size generally corresponding to the interior of the pipe for being installed in the end of the pipe; the sleeve having a main tubular body; the main tubular body having a tubular inner surface including a lower tapered surface which increases in diameter downward along the tubular body and an upper tapered surface above the lower tapered surface which increases in diameter upward along the tubular body;
   a lower pipe fixing member at the lower end of the pipe and engagable with the installation member, and including a first outer peripheral tapered surface which is approximately the shape of a frustum of a cone generally corresponding in pitch angle and diameter to the inner lower tapered surface of the main tubular body and being slidable along the inner lower tapered surface;
   a moveable member at the top part of the main body and including a respective second outer peripheral tapered surface which is approximately the shape of a frustum of a cone generally corresponding in pitch angle and diameter to the upper tapered surface of the main tubular body and installed in the main body and being slidable along the upper inner tapered surface;
   fastening means at the installation member and extending to the fastening device for pulling the moveable member toward the installation member at the end of the pipe, for moving the lower fixing member and the upper moveable member securely against the inner tapered surfaces of the main tubular body to expand the main tubular body and to securely engage the tubular body with the interior of the pipe; and
   a fastening stopper for holding the fixing member and movable member against total separation such that after removal of the fastening means which draws the movable member toward the installation member, the fixing member and the movable member are still held so that they will not fall apart from the main tubular body, thereby enabling subsequent assembly of the pipe fastening device and the installation member.

* * * * *